United States Patent [19]
Goates et al.

[11] Patent Number: 6,139,468
[45] Date of Patent: Oct. 31, 2000

[54] ELECTRONICALLY ACTUATED TRANSMISSION RANGE CONTROL SYSTEM

[75] Inventors: Eldon Lamar Goates, Colorado Springs, Colo.; Charles Edward Marshall, Novi, Mich.

[73] Assignee: Ford Motor Company, Dearborn, Mich.

[21] Appl. No.: 09/292,725

[22] Filed: Apr. 15, 1999

[51] Int. Cl.[7] .................................................. F16H 59/44
[52] U.S. Cl. ................................ 477/97; 477/906; 701/62
[58] Field of Search ....................... 477/906, 97; 701/60, 701/61, 62

[56] References Cited

U.S. PATENT DOCUMENTS

| | | |
|---|---|---|
| 4,509,389 | 4/1985 | Vahratian et al. . |
| 4,637,281 | 1/1987 | Vanselous . |
| 4,665,770 | 5/1987 | Vanselous . |
| 5,016,174 | 5/1991 | Ito et al. ............................. 477/906 X |
| 5,081,886 | 1/1992 | Person et al. . |
| 5,090,269 | 2/1992 | Ohtsuka et al. ...................... 701/62 X |
| 5,150,297 | 9/1992 | Daubenmier et al. . |
| 5,157,608 | 10/1992 | Sankpal et al. . |
| 5,303,616 | 4/1994 | Palansky et al. . |
| 5,383,825 | 1/1995 | El-Khoury et al. . |
| 5,474,506 | 12/1995 | Palansky et al. . |
| 5,655,408 | 8/1997 | Sakakiyama et al. ............... 477/906 X |
| 5,696,679 | 12/1997 | Marshall et al. . |
| 5,754,965 | 5/1998 | Hagenbuch ............................... 701/35 |
| 5,758,304 | 5/1998 | Bray ..................................... 701/62 X |
| 5,790,969 | 8/1998 | McKee ................................. 701/62 X |
| 5,928,110 | 7/1999 | Vornehm et al. ................... 477/906 X |

*Primary Examiner*—Khoi Q. Ta
*Attorney, Agent, or Firm*—Frank G. McKenzie

[57] ABSTRACT

An automatic transmission control system having gearing that establishes multiple forward driving ratios and a reverse ratio as well as a neutral mode, an electrohydraulic control valve circuit for controlling the application and release of clutch and brake elements for the transmission gearing, a driver-controlled range selector for transmitting operator commands to shift control logic, and a failure mode management circuit that monitors the shift control logic and the response of the transmission system to operator commands, as well as the transmission range selector signals delivered to the shift control logic whereby multiple control redundancies in the electronic range control system ensure that system failures and component failures develop an error signal to alert the driver of possible malfunctions during the range selection period. Range feedback information from the transmission and system validation for the electronic microprocessor output commands when multiple error signals are present will result in a neutral default state for the transmission.

7 Claims, 8 Drawing Sheets

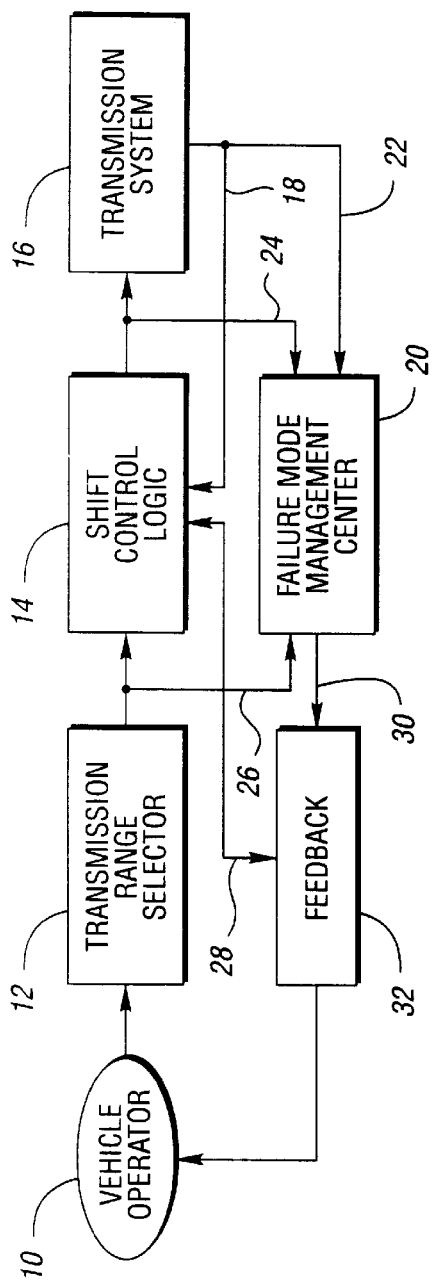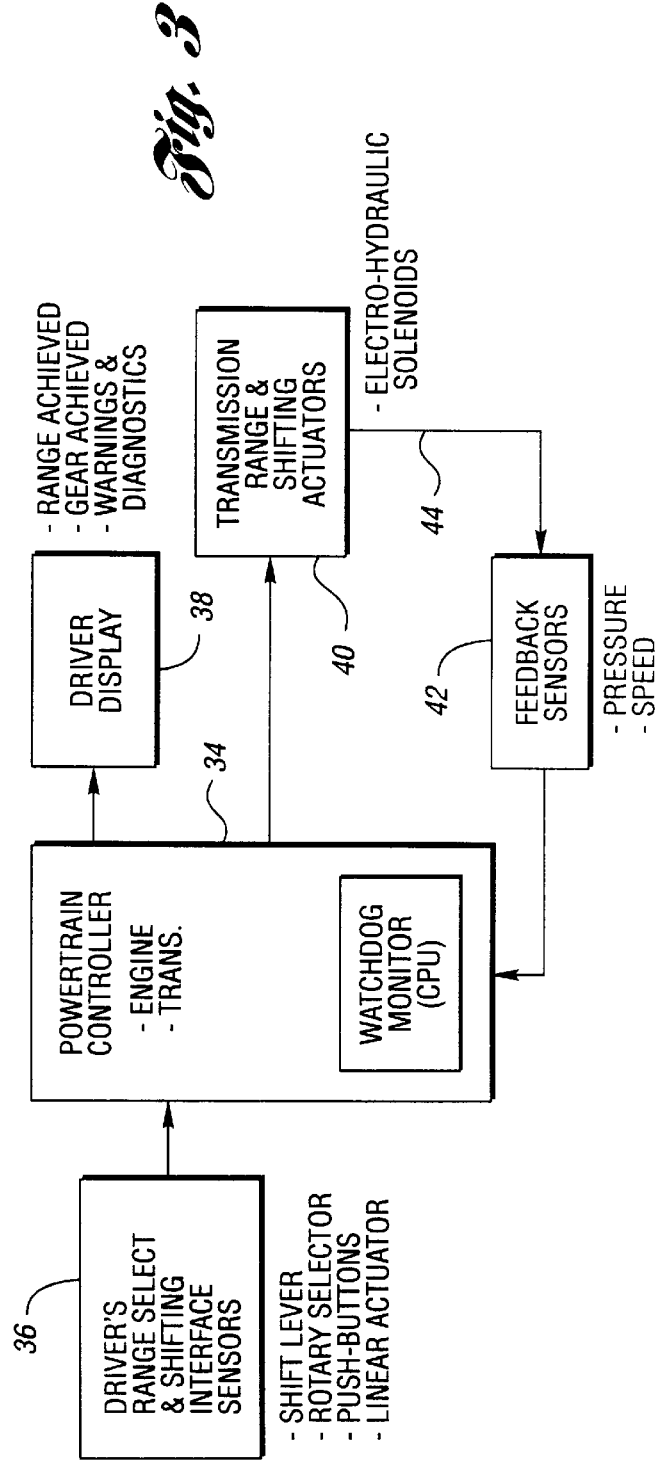

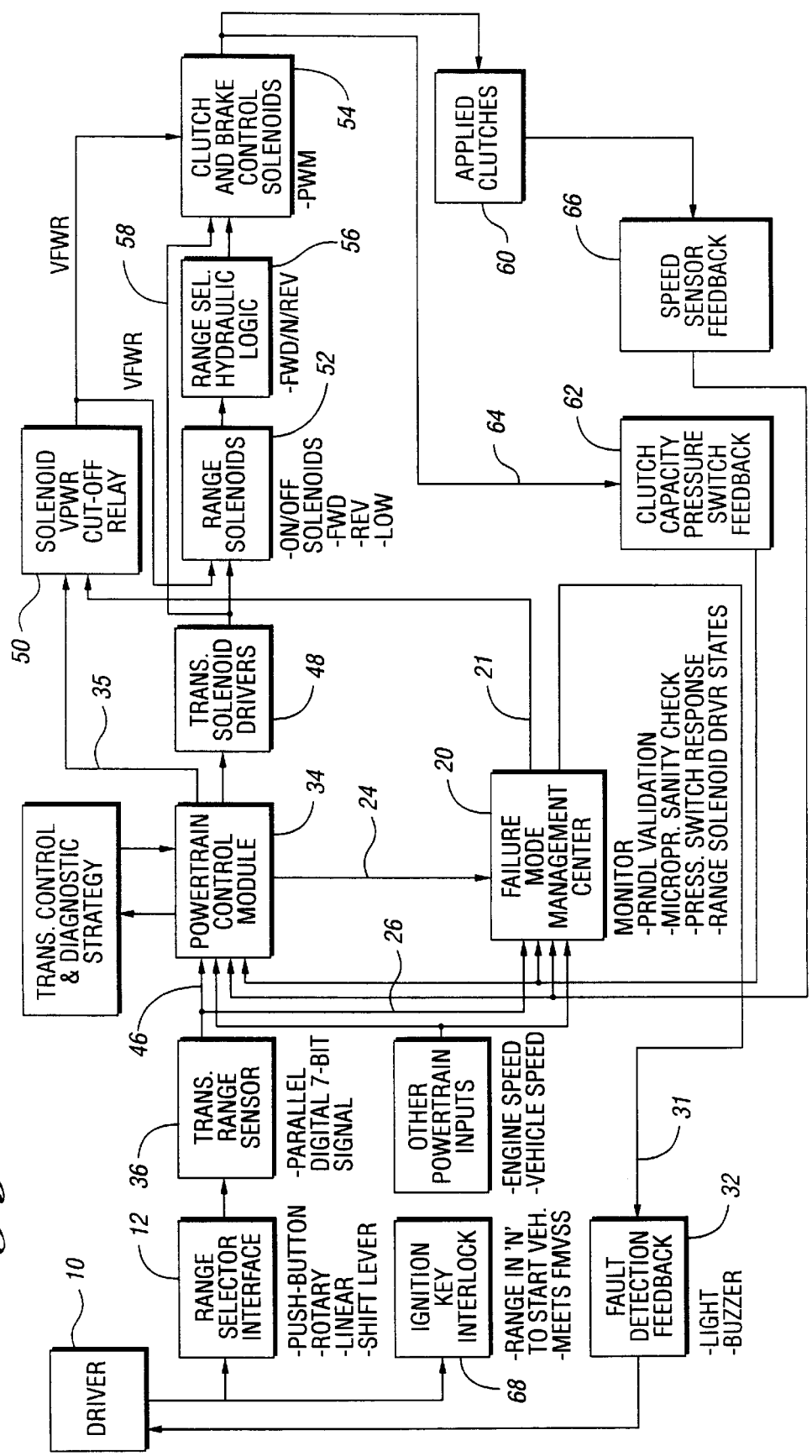

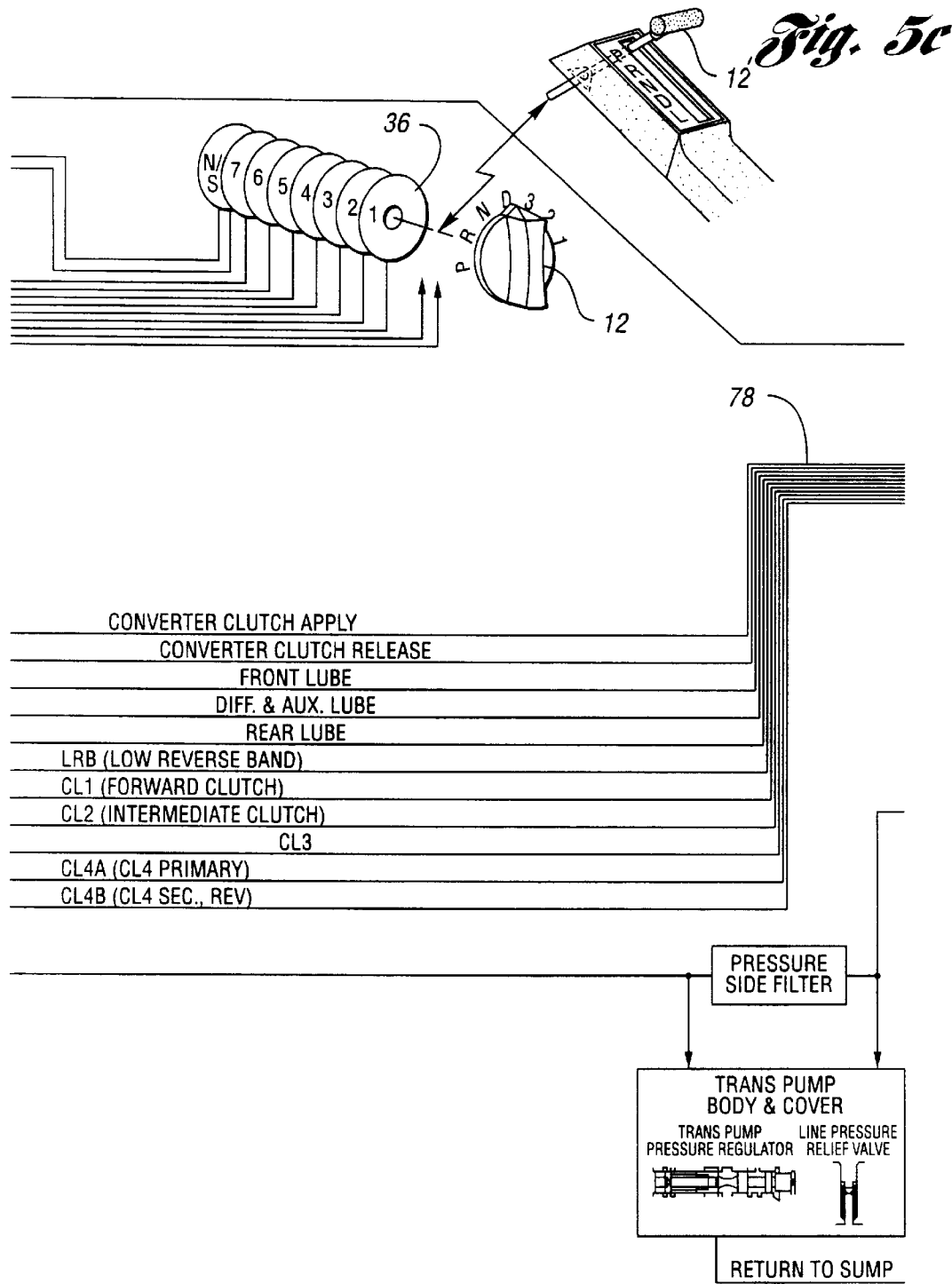

| GEAR | TRANSAXLE ELEMENT APPLICATION ||||||  ENGINE BRAKING | RATIO | STEP |
| --- | --- | --- | --- | --- | --- | --- | --- | --- | --- |
| | B1 N.C. | CL1 N.C. | CL2 N.C. | CL3 N.C. | CL4 N.C. | OWC1 | | | |
| 1M | X | X | | | | X | YES | 2.748 | |
| 1 | | X | | | | X | NO | 2.748 | 38.2% |
| 2A | | X | X | | | O/R | YES | 1.698 | |
| 2B | | X | | X | | O/R | YES | 1.698 | 32.2% |
| 3 | | X | | X | | O/R | YES | 1.151 | 34.3% |
| 4 | | | X | | X | O/R | YES | 0.757 | 25.5% |
| 5 | | | | | X | | YES | 0.561 | |
| R | X | | | | X | | YES | 2.748 | |
| N | | | | | | | | | F.D. = 4.227 |
| P | | | | | | | | | |

NOTE: X SHOWS ELEMENT APPLICATION.
O/R SHOWS OWC OVER RUNS.

*Fig. 5e*

ELECTRONICALLY ACTUATED TRANSMISSION RANGE CONTROL SYSTEM

TECHNICAL FIELD

The invention relates to automotive automatic transmission control systems that do not require a mechanical linkage between a driver-operated range selector lever and a transmission range controller.

BACKGROUND OF THE INVENTION

In a typical automatic transmission system for automotive vehicles, a mechanical motion transmitting linkage or cable mechanism is provided between a driver-actuated range selector lever and a control valve assembly for controlling ratio ranges in the transmission. It is possible to eliminate the mechanical linkage or cable mechanism between the range selector lever and the transmission by providing a driver-controlled switching system that distributes range selector signals to an electrohydraulic control valve assembly for the automatic transmission. An example of such a driver-controlled electronic switching system may be seen by referring to U.S. Pat. No. 5,696,679, which describes an integrated electronic control for moving a transmission park pawl into and out of engagement with a park gear carried by the driven shaft of an automatic transmission. U.S. Pat. No. 5,696,679 is owned by the assignee of the present invention.

The elimination of a mechanical linkage or cable mechanism that operates a range selector valve for an automatic transmission makes it necessary to introduce into the system multiple control redundancies to account for the possibility of system faults. This ensures that forward drive will be achieved when the driver commands forward drive, and that reverse drive will be achieved when the driver commands reverse drive. The same is true when the driver selects a neutral mode.

If an error occurs in any of the functions that are selected by the driver, there is a need for the driver to be alerted to the presence of the error so that appropriate adjustments can be made in the control system or in its calibration to eliminate the error. This alert is needed even though the presence of the error may not result in an erroneous drive range selection following a command by the driver for a particular drive range (i.e., forward drive range or reverse drive or neutral). There is a need also for the transmission system to default to the neutral state when multiple errors are indicated and error signals are fed back to the driver.

The use of a mechanical linkage between a driver-actuated range selector lever and a range control valve in conventional transmission controllers presents space and packaging problems for components located in the underbody area of the vehicle. Further, such mechanical linkages are subject to wear and possible malfunctions. They also may be the source of noise, vibration and harshness problems (NVH), especially after the mechanical linkage elements exhibit wear.

Remote range selector systems for automatic transmissions in automotive vehicles usually are not integrated within the transmission itself. Prior art systems that do not include a mechanical linkage mechanism (e.g., shift-by-wire transmission control systems) may be so-called "add-on" designs that require space within the underbody area of the vehicle. This compromises the ability of the vehicle designer to use efficiently the space in the underbody area for other purposes. In the case of transaxle transmissions for front wheel drive vehicles, the limited space within the engine compartment may present the designer with packaging problems. Furthermore, conversion of a left-hand drive vehicle to a right-hand drive vehicle, and vice versa, becomes more difficult.

BRIEF DESCRIPTION OF THE INVENTION

The electrohydraulic transmission control system of the present invention eliminates the need for a mechanical linkage for an automotive vehicle automatic transmission having a driver-actuated range selector in the vehicle passenger compartment. This is achieved by providing an electrohydraulic transmission controller that is integrated within the transmission casing.

The controller of the present invention does not require a dedicated space external to the transmission as in the case of so-called "add-on" devices. It includes shift and range control solenoid actuators for the hydroelectric control valve system within the transmission case itself.

The controller includes a driver-actuated range selector lever, sometimes referred to as a "PRNDL" lever, and a microprocessor with shift control logic and strategy for controlling the transmission. It also includes a failure mode management center (FMMC) to provide a watchdog function to oversee the range selection functions and to detect faults in the transmission system. The failure mode management center (FMMC) disallows certain driving conditions. It also provides feedback information to the driver to confirm that the correct transmission range has been achieved following an appropriate range selection by the operator. Further, it will provide a warning that an error exists in the system, even though the desired range selection has been achieved following a command for that range.

The control system of the invention permits the driver to select a range at a transmission range selector interface. The shift control logic and the failure mode management center validate the selection made by the operator. The control logic will request a gear ratio or a range at the transmission electrohydraulic valve system after the correct gear or range has been validated by the failure mode management center.

The transmission is monitored by the control logic as well as by the failure mode management center to give appropriate feedback information to the driver. This will permit a timely response to a fault in the system. If the fault is not detected by the logic, or if for some reason the logic is unable to recognize the fault, the failure mode management center ensures that the function that is commanded is achieved or that a default mode (i.e., neutral) will be established.

The control system of the invention includes a driver controlled transmission range selector including a selector position sensor having a multiple digital bit output signal, a forward drive range being characterized by a first digital code or number and reverse drive mode being characterized by a second digital code or number. An electronic powertrain controller for the engine and transmission has signal input conditioning circuits that communicate with the selector position sensor and output driver circuits that communicate with the solenoid actuators. A transmission control module has a memory register with programmed digital numbers corresponding to reverse mode and to forward drive range. The selector position sensor output signals are compared to the programmed digital numbers to detect a fault. A fault detector feedback alerts the driver of the presence of a selector fault.

BRIEF DESCRIPTION OF THE FIGURES OF THE DRAWINGS

FIG. 1 shows a simplified, electronically actuated range system block diagram illustrating a structural environment for the invention.

FIG. 3 is a general block diagram of the transmission system using a "shift-by-wire" controller for achieving transmission range selections. This is an overview of the information indicated in FIGS. 1 and 2.

FIG. 4 is a block diagram showing an electronically actuated range control system for an automatic transmission wherein the driver feedback information is illustrated as well as the function flow path from the transmission range selector to the brakes and clutches of the transmission and to the ratio shift and range selector solenoids.

PARTICULAR DESCRIPTION OF THE INVENTION

Figure 2:
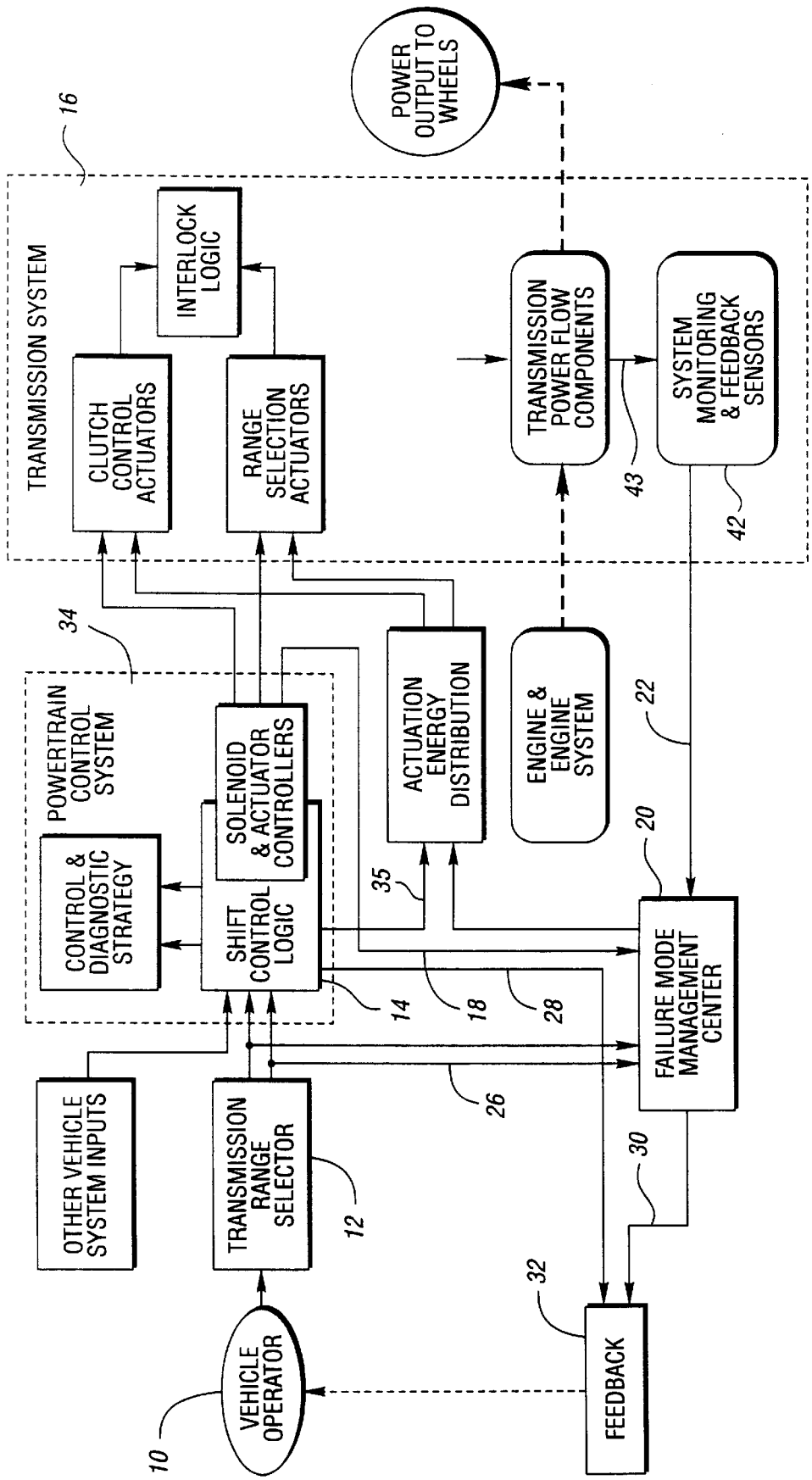
FIG. 2 is a more complete range control system block diagram corresponding to the block diagram of FIG. 1 wherein the flow of information (i.e., the commands by the driver and the feedback information) are illustrated more specifically than they are in the block diagram of FIG. 1.

FIG. 1 shows a simplified diagram of the overall system, which incorporates redundant transmission range selector controls. The vehicle operator is identified in FIG. 1 at location 10. The vehicle operator operates a transmission range selector, which may be a PRNDL range selector lever in the vehicle passenger compartment or a rotary switch or push buttons on a control console in the vehicle passenger compartment. The range selector is designated schematically in FIG. 1 by block 12.

The position of the transmission range selector creates a signal that is one of several inputs for shift control logic identified by block 14. The logic controls activation and deactivation of clutch and brake control solenoids as well as transmission control circuit pressures in a transmission system, which is identified by block 16.

The transmission system responses to the control signals delivered to it by the shift control logic are transmitted back to the shift logic portions of the control system through signal flow path 18. The same output of the transmission system is delivered to a failure mode management center identified by block 20. The failure mode management center forms a portion of the overall powertrain controller for the transmission and the engine.

The information from the transmission system 16 is transmitted to the failure mode management center through signal flow path 22. That information is compared to the shift control logic information transmitted to the transmission system 16. This shift control logic information is transmitted to the failure mode management center through signal flow path 24.

The failure mode management center 20, furthermore, receives information transmitted by the transmission range selector to the shift control logic. That information is distributed through signal flow path 26 to the failure mode management center 20.

A fault detection feedback circuit is in communication with the shift control logic portion of the system through signal flow path 28. It is in communication also with the failure mode management center 20 through signal flow path 30. The information received by the feedback circuit, which is identified by reference numeral 32, activates a fault light or a fault buzzer, which alerts the operator at 10 to the presence of a fault in the transmission system or in the shift control logic or in the transmission range selector. Thus, the failure mode management center acts as a system watchdog to validate the action of the transmission system, the range selector and the shift control logic.

FIG. 2 is a more detailed block diagram showing in simplified form an electronically actuated range system illustrating the signal flow paths for the electronic controller for the powertrain and the transmission system. Transmission systems of the type schematically illustrated in FIG. 2, as well as in FIGS. 3 and 4, are described in U.S. Pat. Nos. 4,509,389, 5,474,506, 5,303,616, 4,637,281, 4,665,770, 5,157,608, 5,081,886, 5,150,297, and 5,383,825. Each of these reference patents is owned by the assignee of the present invention. Reference may be made to these patents to supplement the present disclosure. The disclosures of these patents, as well as U.S. Pat. No. 5,696,679, are incorporated herein by reference.

FIG. 3 is a simplified block diagram showing a so-called shift-by-wire control system and the relationship of the range selector and transmission range and shifting actuators to the overall powertrain controller, the latter being illustrated at 34. In the case of the control system of the present invention, as well as in the case of the transmission systems illustrated in the reference patents identified above, the powertrain controller is an integrated controller that controls engine functions as well as transmission functions.

The interface sensors for the operator's range selection is illustrated in block diagram form at 36 in FIG. 3. The interface associated with block 36 can be a conventional PRNDL shift lever, a rotary selector, or transmission push buttons. The output of the operator's range selection at block 36 is displayed at 38 as the powertrain controller receives information from block 36 and generates an appropriate display signal. The display indicates the range that is achieved, the gear that is achieved, and warning and diagnostic information.

The controller 34, as will be described more particularly with respect to FIGS. 4 and 5a–5d, controls transmission range and gear shifting actuators, as indicated at block 40. The control signal flow path to the block 40 is shown at 42. Corresponding feedback information from the block 40 is distributed to the feedback sensor 43 through signal flow path 44.

As indicated in FIG. 4, the range selections are made at 12, as previously described. The transmission range is sensed by a position sensor shown at 36, and the output is distributed to a powertrain control module 34 through signal flow path 46. The same position information is transferred through signal flow path 26 to the failure mode management center 20 through the previously described function flow path 46. The failure mode management center 20 receives through signal flow path 24 the same information that is transmitted to the transmission solenoid driver circuits 48, which drive the solenoids in the transmission system 16 (see FIGS. 1 and 2).

A solenoid vehicle power cutoff relay 50 is triggered by the controller 34 to interrupt delivery of power to the range solenoids 52 and the clutch control solenoids 54 in the event of a malfunction. Range solenoids 52 control the on/off solenoids for forward drive, reverse drive and low range operations. The failure mode management center 20 also communicates with relay 50 to overrule the relay if the module 34 fails to cut off power to the solenoids. The module 34 is connected to relay 50, as shown at 35, and the failure mode management center 20 is connected to relay 50, as shown at 21. The connections at 21 and 35 thus provide a still further redundancy in the system.

The range solenoids control distribution of actuating pressure to the hydraulic logic system 56, which distributes actuating pressure to the control solenoids 54. The actuating signals are distributed to the solenoids 54 through signal flow path 58 from the solenoid driver circuit 48.

The clutches in the transmission system are shown in block diagram form in FIG. 4 at 60. The pressure that is distributed to the clutches 60 is sensed by a clutch capacity pressure switch feedback circuit shown at 62. The feedback pressure signal is distributed through signal flow path 64. If the pressure switch at 62 is activated, the fault is detected by the powertrain control module 34 and by the failure mode management center 20. The pressure switch signal will indicate whether fluid pressure is being correctly applied to the clutches and brake. If a fault is present, the failure mode management center would send a signal to fault detection feedback circuit 32 through path 31. A light or a buzzer then would be triggered by the feedback circuit 32.

A transmission output speed sensor shown at 66, receives speed information from the applied clutches 60 and distributes it to the failure mode management center 20 as well as to the powertrain control module 34. The speed sensor feedback at 66 signals the powertrain control module 34 and the failure mode management center 20 whether the output shaft or the intermediate torque transfer element for the transmission system is being driven at the appropriate speed for the clutch that is applied.

The feedback provided by sensor 66 actually is redundant with respect to the feedback provided by pressure switch 62 since each would indicate a failure of the system to engage a clutch.

An ignition key interlock of conventional design is indicated in FIG. 4 at 68. This is connected electronically to the range selector interface and makes certain, before starting the vehicle engine, that the transmission is in neutral gear by interrupting the starter motor circuit for all selector positions other than neutral and park.

The solenoid vehicle power cutoff relay 50 is normally closed. If there is an electrical system failure or another type of system failure, the cutoff is actuated to disallow delivery of power to the solenoids. The transmission then will default to a neutral state.

If the failure mode management center 20 detects a fault in the system, the feedback circuit 32 is activated. The fault signal is delivered to feedback circuit 32 through connection 31.

The control block 54 is an electronic shift control solenoid body that controls the clutches and brake with variable force solenoids and PWM solenoids.

Figure 5A:
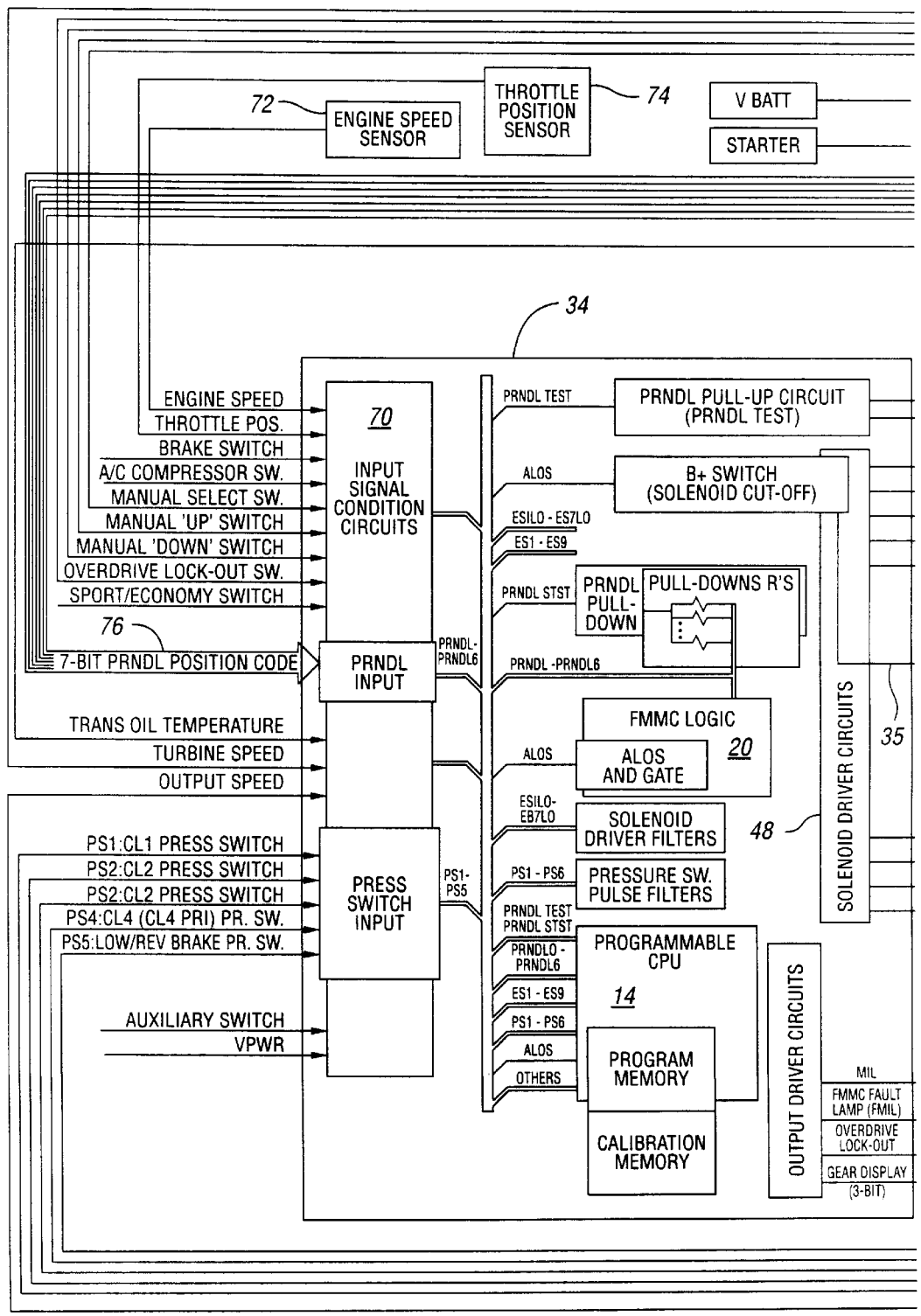
FIG. 5 is a schematic circuit diagram corresponding to FIG. 4 wherein the elements of the individual subsystems illustrated in block diagram form in FIG. 4 have been illustrated in more detail.
Figure 5B:
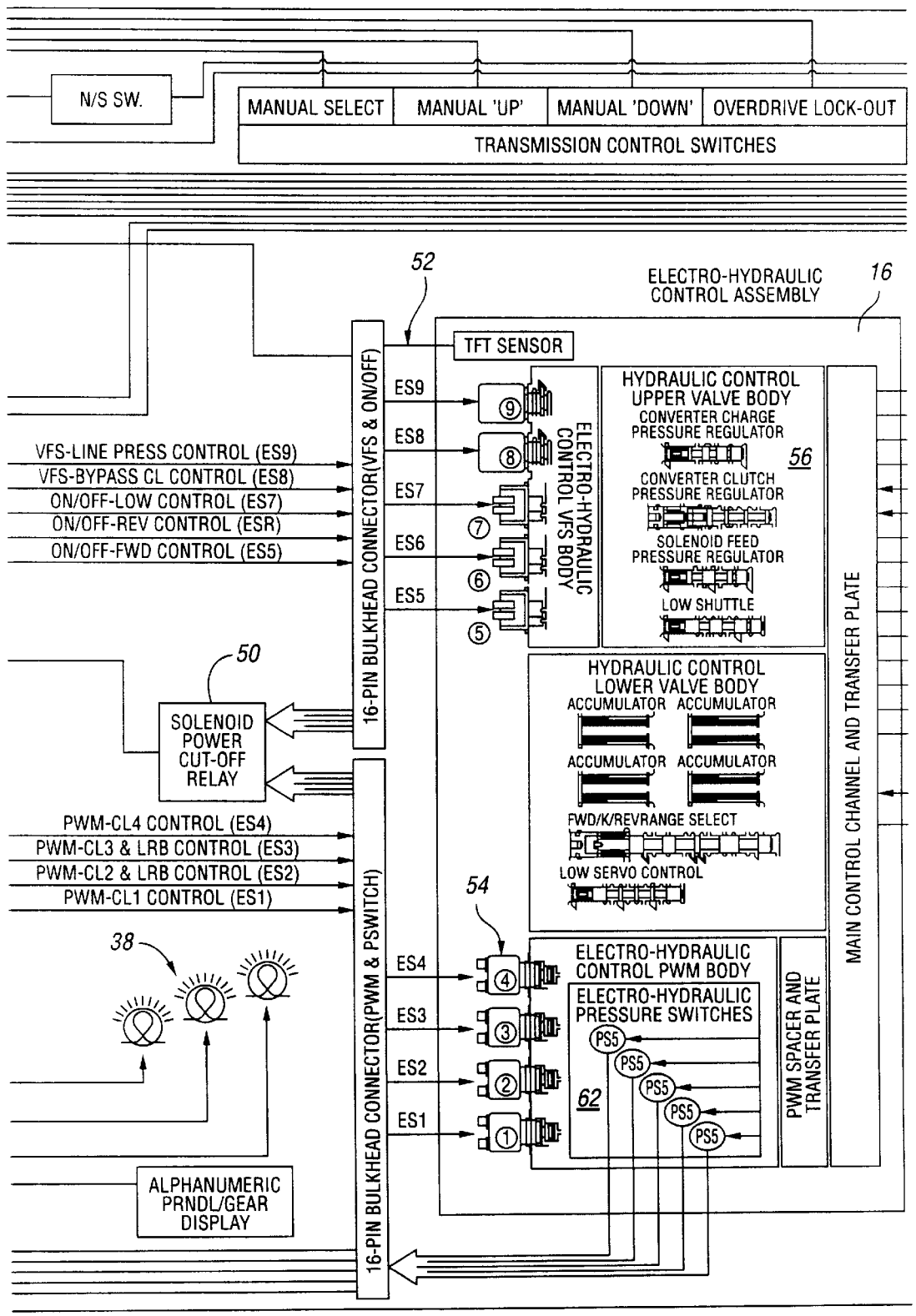
Figure 5B:
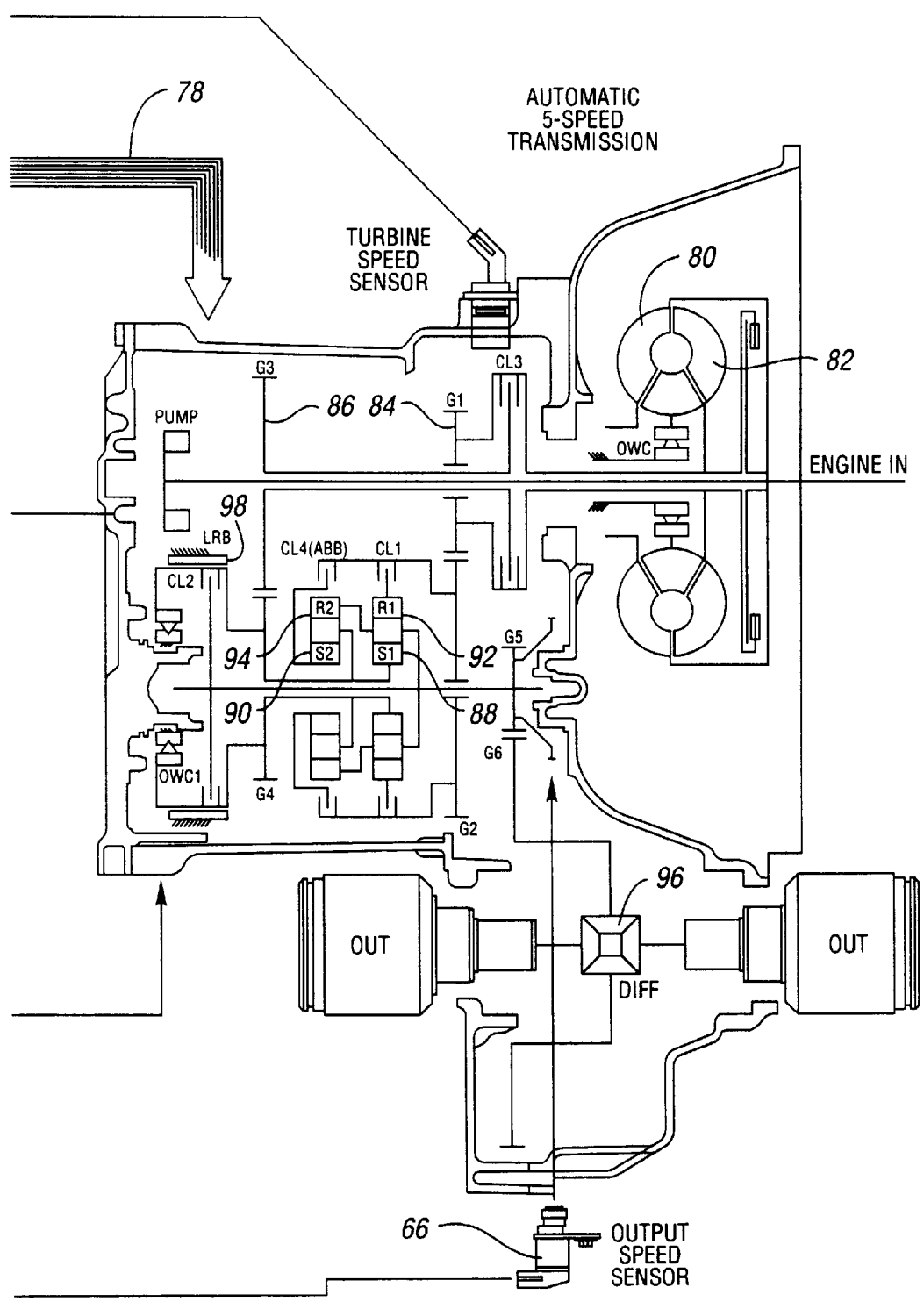

In FIGS. 5a–5c, the elements and subcircuits that are described with reference to FIG. 4 have been indicated by similar reference numerals. FIG. 5a shows the solenoid driver circuits at 48 and input signal conditioning circuits at 70. The input signal conditioning circuits 70 receives an engine speed signal from engine speed sensor 72, a throttle position signal from engine throttle position sensor 74 and other input signals that are identified by appropriate labels in FIG. 5a.

A seven-bit position code, a digital number, is distributed to the input signal conditioning circuit 70 through function flow paths 76. The signals received from the seven-position, seven-bit signal trace is indicated at 36 in FIG. 5c. The position sensor is adjusted by a rotary selector 12 in the embodiment of FIG. 5c, although a lever may be used also, as indicated at 12' in FIG. 5a. The selector lever 12' would be used as an alternate to a rotary selector 12 shown in FIG. 5c.

The gear shift lever or rotary selector is a seven-bit selection sensor. There is a four-bit separation between the bits indicating reverse drive and the bits indicating forward drive. For example, the sensor output indicating reverse drive could be represented by the digital number 1010111. Further, the forward drive selection could be indicated by the digital number 1101011.

It will be necessary for the reverse drive digital number to have four out of seven bits fail in order to make the reverse drive digital number look like the forward drive digital number. For example, the second bit for the reverse digital number must be changed to 0 from 1, the third bit must be changed from 1 to 0, the fourth bit must be changed from 0 to 1, and the fifth bit must be changed from 1 to 0 in order to make the "R" digital number look like the D digital number. Similarly, four out of seven bits must fail before the "D" digital number will look like the "R" digital number. For example, the second bit must be changed from 1 to 0, the third bit must be changed from 0 to 1, the fourth bit must be changed from 1 to 0, and fifth bit must be changed from 0 to 1 before the "D" digital number will look like the "R" digital number. This four-bit separation ensures that reverse drive will not be achieved if forward drive is intended. It will also ensure that reverse drive will not be achieved when forward drive is intended.

In addition to the foregoing, two pairs of bits of the four bits of the four-bit separation must change in opposite directions before the reverse drive digital number will look like the forward drive digital number and/or before the forward drive digital number will look like the reverse drive digital number. For example, two of the four bits involved in a faulty signal must change from high to low or from low to high before the reverse drive digital number will look like the forward drive digital number, and vice versa. This provides added assurance that one digital number will not be mistaken for the other.

It is possible to achieve forward drive if there is only a one-bit difference between the correct digital number and the actual digital number. In that event, forward drive will be achieved, but the single error that occurs will result in an error signal being displayed by the feedback circuit 32 (see FIG. 4). On the other hand, when there are two or more failures following the selection of the drive range, the drive range will not be achieved. Rather, the transmission will default to a neutral state. The same is true if two or more errors are present when reverse drive is selected. If a single error is present, reverse drive will be achieved; but if there are two or more failures, neutral state, which is the default state, will be achieved.

The output driver circuit 48 delivers signals to the electrohydraulic control assembly 16 as indicated in FIG. 5b. The pressure distribution circuits are schematically represented in FIG. 5d by reference numeral 78.

The clutches and brakes for the automatic transmission are indicated in FIG. 5d. The engine drives the impeller of a hydrokinetic torque converter, as shown at 80. The turbine of the hydrokinetic torque converter, shown at 82, drives through compound clutch CL3 a first torque input gear 84 or a second torque input gear 86. Gear 86 drives a first sun gear 88, and gear 84 drives a second sun gear 90 when clutch CL4 is engaged. Clutch CL1 drivably connects the gear 84 to the ring gear 92. The carrier for sun gear 88 and ring gear 92 are connected to the ring gear 94.

The carrier for the sun gear 88 and the ring gear 92 drives the input for differential gearing 96 at the final drive portion of the transmission mechanism. Clutch CL2 connects the carrier for the ring gear 92 and the sun gear 88 to the carrier for ring gear 94 and sun gear 90. A low-and-reverse brake is shown at 98 for anchoring sun gear 88 during low-and-reverse drive.

FIG. 5e is a chart that shows a clutch and brake engagement and release pattern for each of five driving ratios and for reverse drive for the transmission shown in FIG. 5d.

The failure mode management center is a system watchdog that oversees the range functions. It detects faults and failures and compensates by disallowing certain conditions to exist if the correct selection following the operator's movement of the selector lever is not achieved.

The driver selects a position of choice at the transmission range selector. The shift control logic and the failure mode management center validate the selection. The control logic then requests a gear or a range selection at the transmission, and that selection is validated by the failure mode management center. Thus, both the control logic and the failure mode management center monitor the transmission response by means of pressure switch 62 and speed sensor 66.

The output of the range selector interface 12 must pass through the transmission range position sensor 36 before the selector information gets to the solenoids.

The failure mode management center is specifically a fault mode manager and watchdog. It is second in hierarchal order and is subordinate to the shift control logic. It responds to the system faults. The response to the system faults is determined by the diagnostic strategy at the control logic; but if for some reason the control logic is unable to recognize or to respond to a fault, the failure mode management center takes command and ensures a proper default mode. Typically, the default mode would be neutral. A positive feedback is provided to the driver for verification and acceptance. A reaction by the driver then is given appropriate confirmation by the system.

Although a specific embodiment of the invention is disclosed, modifications may be made by persons skilled in the art without departing from the invention. All such modifications and all equivalents are within the scope of the claims.

What is claimed is:

1. A control system for a multiple-ratio automatic transmission for an engine-driven vehicle, the transmission having gearing and pressure-operated clutches and brakes for controlling the gearing to define a range of forward drive ratios, a reverse drive mode and a park mode, the control system comprising:

range and ratio solenoid actuators for controlling pressure distribution to the transmission clutches and brakes;

a driver controlled transmission range selector including a selector position sensor, the position sensor having a multiple digital bit output signal, a forward drive range being characterized by a first digital number and reverse drive mode being characterized by a second digital number;

an electronic controller for the transmission, the controller having signal input conditioning circuits communicating with the selector position sensor and output driver circuits communicating with the solenoid actuators; and a control module forming a part of the electronic controller and having a memory register with programmed digital numbers corresponding to reverse mode and to forward drive range;

the control module including means for comparing the selector position output signals with the programmed digital numbers to detect an error in the digital numbers indicating a fault in the selector position;

fault detection feedback means for alerting the driver of the presence of a selector position sensor fault;

the control system having a solenoid power cutoff relay electrically connected to the output driver circuits and the solenoid actuators for controlling delivery of power to the solenoid actuators in response to the detection of two or more errors in the digital numbers developed by the range selector position sensor.

2. The control system set forth in claim 1 wherein the powertrain controller includes a failure mode management logic center that is in communication with the input signal conditioning circuits of the electronic controller and with the solenoid power cutoff relay, the failure mode management logic center monitoring the transmission control module to validate range solenoid states.

3. The control system set forth in claim 2 including a clutch capacity pressure switch communicating with the transmission clutches, the control module and the failure mode management center communicating with the clutch capacity pressure switch whereby the clutch capacity is monitored.

4. The control system set forth in claim 2 including a speed sensor for monitoring the driven speed of the transmission clutches, the control module and the failure mode management center communicating with the speed sensor.

5. The control system set forth in claim 2 wherein the control module includes ratio shift logic means for conditioning the solenoid actuators to effect a neutral state in response to the detection of errors in the range selection sensor.

6. The control system as set forth in claim 1 wherein the errors are indicated by a detected discrepancy in the state of two bits of a four-bit separation between the digital numbers for forward drive and reverse drive.

7. The control system as set forth in claim 6 wherein the errors indicated by a detected discrepancy in the state of two bits of a four-bit separation between the digital numbers for forward drive and for reverse drive are defined by a change of state of two bits in the same direction wherein two pairs of bits of one digital number become high as a pair of bits for the other digital number becomes low.

* * * * *